(12) United States Patent
Gonzalez Alemany et al.

(10) Patent No.: US 7,926,641 B2
(45) Date of Patent: Apr. 19, 2011

(54) CONVEYOR SYSTEM FOR THE TRANSPORT OF PASSENGERS/GOODS

(75) Inventors: Miguel Angel Gonzalez Alemany, Oviedo (ES); Juan Domingo Gonzalez Pantiga, Gijon (ES); José Ojeda Arenas, La Fresneda Concejo de Siero (ES)

(73) Assignee: Thyssenkrupp Elevator (ES/PBB) Ltd., London (GB)

( * ) Notice: Subject to any disclaimer, the term of this patent is extended or adjusted under 35 U.S.C. 154(b) by 0 days.

(21) Appl. No.: 12/570,775

(22) Filed: Sep. 30, 2009

(65) Prior Publication Data

US 2010/0084245 A1    Apr. 8, 2010

Related U.S. Application Data

(63) Continuation of application No. 11/949,298, filed on Dec. 3, 2007, now abandoned.

(51) Int. Cl.
*B66B 23/02*    (2006.01)

(52) U.S. Cl. ...................................................... 198/330

(58) Field of Classification Search .................. 198/330, 198/832, 833, 835
See application file for complete search history.

(56) References Cited

U.S. PATENT DOCUMENTS

| 3,107,773 A | 10/1963 | Clemetsen et al. |
| 3,677,388 A | 7/1972 | Boltrek et al. |
| 6,527,099 B2 | 3/2003 | Ostermeier et al. |
| 6,540,060 B1 | 4/2003 | Fargo et al. |
| 2008/0053788 A1 | 3/2008 | Ishikawa et al. |

FOREIGN PATENT DOCUMENTS

| WO | WO 2004/054919 | 7/2004 |
| WO | WO 2004/063078 | 7/2004 |

*Primary Examiner* — James R Bidwell
(74) *Attorney, Agent, or Firm* — Merchant & Gould P.C.

(57) ABSTRACT

The invention relates to a pallet actuation system moving the pallets of a moving walkway through drive chains directly engaging the lower part of the chains of traction links. The drive chain has separate drive rollers which are made of deformable and elastic materials. The links of the traction chains are connected together by connecting shafts and have teeth and claws in the lower part to mesh with the drive chain and the rollers.

22 Claims, 8 Drawing Sheets

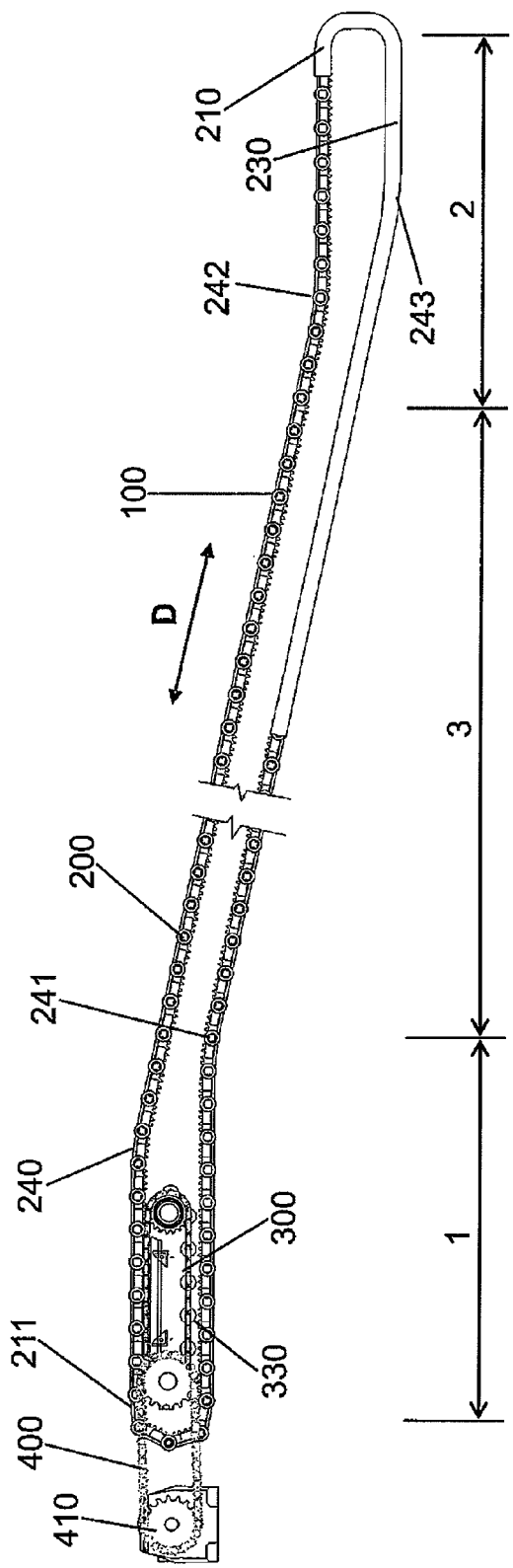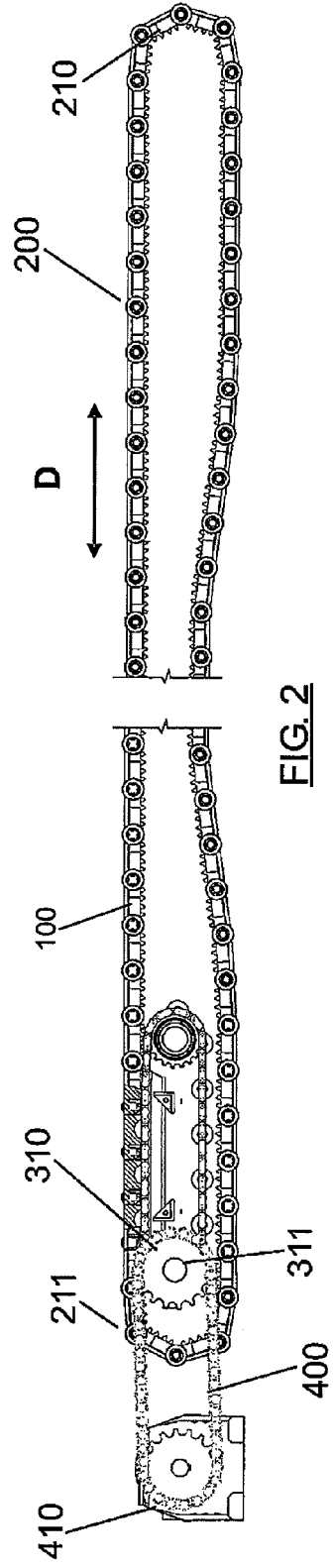
FIG. 1
FIG. 2

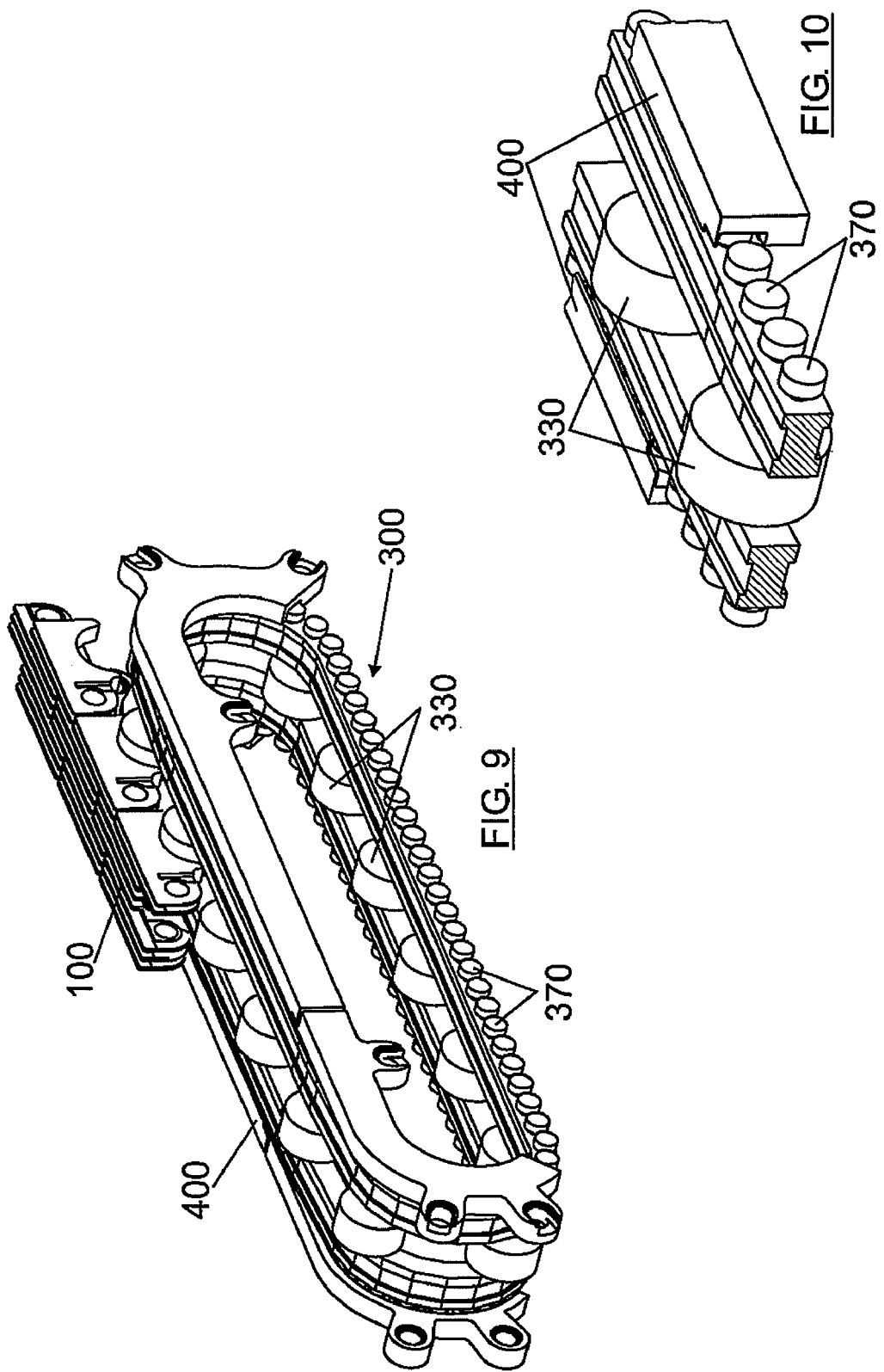

CONVEYOR SYSTEM FOR THE TRANSPORT OF PASSENGERS/GOODS

This application is a Continuation of U.S. Ser. No. 11/949,298, filed 3 Dec. 2007 and which application is incorporated herein by reference. To the extent appropriate, a claim of priority is made to the above disclosed application.

FIELD OF THE INVENTION

The invention relates to a passenger or goods conveyor system and, more particularly to a moving walkway pallet actuation system.

BACKGROUND OF THE INVENTION

Conventional passenger conveyor devices such as mechanical stairs or moving walkways include a chain of steps or pallets which shift in a loop to provide continuous movement along a specific trajectory. The steps or pallets are connected to said chain link loop of steps or pallets acting together with an actuation system. The actuation system normally consists of a chain of steps or pallets, actuation gear wheels, a shaft and an electric drive motor. The drive motor actuates the drive gear wheel which conveys movement to the links of the chain of steps or pallets. While the links of this chain move, the steps or the pallets move as desired.

To assure small speed fluctuation and to minimize the polygon effect in the conventional conveyor system, a large number of teeth are required on the actuation gear wheel and this leads to a large gear wheel diameter. The large gear wheel diameter increases the size of the upper and lower heads of the system, making a deep pit for placing the walkway necessary. The link between the pallet and the chain of pallets is commonly located under the surface of the pallet. Given that the gap between two consecutive pallets is limited to meet safety requirements, the transition radius in inclined walkways is limited.

Other types of actuation mechanisms engaging the conveyor at intermediate points have been proposed, such as those shown in U.S. Pat. No. 3,677,388, WO2004/063078A1 and WO2004/054919A1. The common feature of the previously mentioned inventions is that they all propose using a linear actuation system to move any type of chain connected to the steps or pallets and, therefore driving the chains of pallets or steps of the conveyor system. Nevertheless, the metal to metal contact between the chain of the linear actuation system and the chain links connected to the steps or pallets makes noise. The general configuration proposed in these documents does not allow the possibility of reducing the dimensions of the conveyor. The general dimensions of conventional walkways are much larger than those which can be provided by the present invention.

SUMMARY OF THE INVENTION

A conveyor system, such as a moving walkway designed according to this invention, which can operate in both directions of transport improves the comfort and safety of the passenger, reduces the height of the upper and lower end sections of the conveyor system, reduces the cost of the conveyor system, eliminates the need for extensive civil construction job to create a pit and enable a portable moving walkway system.

The pallet actuation system for the proposed moving walkway includes a small horizontally arranged geared motor, short pallets specially designed with upper grooves, small actuation gear wheels, actuation shafts and a drive chain formed by transmission chains and a plurality of separate deformable rollers. The drive chain directly meshes with a claw or first arc-shaped engagement means designed under each of the traction links. The short pallet allows the radius of the return section to be small and therefore the upper and lower heads of the conveyor system can be designed with a smaller height in comparison with solutions in the state of the art. The small teeth and the claw are designed under each traction link. The pallets can be part of the traction chain and its linkage is located close to the bearing surface, allowing a small transition radius for inclined walkways. The deformable drive roller meshes with the claw under the traction link. When the drive rollers experience deformation above a certain level due to a high contact force, the lower teeth can mesh with the drive chain. Such design assures that the high force is shared between the deformable drive rollers and the drive chain. Furthermore if the shaft-pin or rod of the drive rollers breaks for any reason, the actuation system will continue to operate safely.

Many actuation modules can be used in larger moving walkways, whereby one can be located at the upper end and the other one at the lower end.

Since the invention can be applied both to moving walkways, in which the surface of the pallets is maintained parallel to the movement, such as mechanical stairs (in which the steps convey passengers between locations on different levels, always maintaining the stepping surface horizontal), hereinafter when pallets are referred to, steps of a mechanical stair are also included as pallets.

Therefore, the invention relates to a conveyor system for the transport of passengers/goods comprising:
  a plurality of traction links connected together by means of shafts-pins perpendicular to a longitudinal direction of transport D to form a chain of traction links;
  actuation means to transmit actuation movement from at least one motor (said actuation means comprising a plurality of actuation chains and gear wheels or other power transmission systems).

The invention is characterized in that:
  it comprises drive means configured to transmit drive movement from the actuation means to the chain of traction links;
  the links of the traction chain comprise:
    a functional surface having first engagement means;
    the drive means comprise second engagement means having a shape conjugated with the first engagement means, so that the traction links are driven by the drive means by means of a mechanical interference or engagement between the first engagement means and the second engagement means and driving said chain of traction links in the direction of transport D.

The system of the invention can comprise a plurality of load conveyor pallets having:
  a supporting surface configured to bear a passenger/good;
  the functional surface opposite to the supporting surface having the traction links.

The system of the invention contemplates that the engagement between the drive chains and the traction chain can occur on one side or on both. Therefore the drive means can comprise:
  a first section between a follower drive wheel and a leading drive wheel according to the direction of transport D;
  a second section between a leading drive wheel and a follower drive wheel according to the direction of transport D;

in which the engagement between the first engagement means and the second engagement means can occur in an engagement area selected from the first section and the first section plus the second section.

In the system of the invention:
the first engagement means can comprise a concave arc perpendicular to the longitudinal direction of transport D;
the second engagement means can comprise a drive roller perpendicular to the longitudinal direction of transport D;
to form a first engagement:
in a direction perpendicular to the longitudinal direction of transport D;
between the drive means and the chain of traction links when the drive roller is housed in the concave arc.

Likewise in the system of the invention:
the first engagement means can comprise a plurality of teeth-shaped projections perpendicular to the longitudinal direction of transport D;
the second engagement means can comprise a plurality of housings perpendicular to the longitudinal direction of transport D;
to form a second engagement
in a direction perpendicular to the longitudinal direction of transport D;
between the drive means and the chain of traction links when the teeth-shaped projections are housed in the housings;
when the drive roller is deformed in the first engagement to prevent large loads on said roller.

The drive means can comprise:
at least one pair of drive chains formed by links and bushings, the drive chains of each pair being opposing such that the shafts of the bushings are co-linear;
a plurality of drive rollers between the drive chains, the shaft of said drive rollers being co-linear with the shaft of two opposing bushings.

In this case, the drive rollers can have a length substantially equal to a space between the drive chains of each pair.

The system of the invention can likewise comprise a drive roller for each link of the traction chain.

In addition, the drive means can comprise at least one drive chain formed by links and bushings, a plurality of cavities configured such that the teeth mesh with the chain in said cavity being defined between the links and bushings.

Optionally, the first engagement means, i.e. the teeth or the claw, can be laminated with a first outer layer comprising materials selected from deformable and resilient materials.

Similarly, the drive rollers can be made of materials selected from deformable and resilient materials.

In other cases, the drive rollers can be laminated with a second outer layer comprising materials selected from deformable and resilient materials.

Likewise, the drive rollers can be made of polymer materials.

The drive rollers can alternatively be laminated with a second outer layer made of polymer materials.

In those cases, the polymer materials can be selected from elastomers, polyurethanes and combinations thereof.

In addition, the bushings of the chain can have a third outer layer comprising materials selected from deformable and resilient materials.

This third outer layer can be made of polymer materials.

In those cases, the polymer materials can be selected from elastomers, polyurethanes and combinations thereof.

These first, second and third outer layers allow the gears between the different elements involved in transmitting movement to be much smoother than with metal-metal contact, which involves quieter operation and with dampened contacts between starting and end engagement moments in addition to elongating the useful life of said elements.

Another feature contemplated in the system of the invention is that the connection between pallets through the shafts-pins is lubricated by means of lubricants selected from dry and wet lubricants.

The connection between the shafts of the drive roller and the drive rollers can be carried out by means of ball or friction bearings.

In addition, the drive chains can have, coaxially to each of its linkages, a guide roller completely defining, by means of a guide and a counter-guide, the path to be followed by the chain, allowing the chain to work by being pushed and preventing the necessary tension in the tension shaft of said chain so that it can work by being pulled.

In summary, the invention relates to a pallet actuation system moving the pallets of a moving walkway through drive chains directly engaging the lower part of the traction chains. The drive chain has separate drive rollers which are made of deformable and elastic materials. The links of the traction chain are designed with teeth and claws in the lower part to mesh with the drive chain and the rollers. The short pallet and the traction system allow a small radius in the return section and, therefore, reduce the height of the heads of the walkway. Furthermore, since the connecting shaft is located close to the surface of the pallet, it is possible to design inclined moving walkways with smaller transition radiuses without opening large gaps between the pallets, reducing the total length of the moving walkway for a specific elevation and allowing the gaps existing between pallets to be decreased. This system allows more than one actuation to be located in different parts of the walkway. The total dimensions of the moving walkway are reduced with this invention and low noise and vibration levels are assured, improving user comfort.

BRIEF DESCRIPTION OF THE DRAWINGS

A series of drawings is very briefly described below which aid in better understanding the invention and which are expressly related to an embodiment of said invention, presented as a non-limiting example thereof.

FIG. 1 is a schematic sketch of an inclined moving walkway with the actuation system of the invention.

FIG. 2 is a schematic sketch of a moving walkway horizontal with the actuation system of the invention.

FIG. 9 is a perspective view of the drive chain with its guides assembled laterally to completely define the path to be followed by the chain.

FIG. 10 is a detailed perspective view of the drive chain with deformable drive rollers and with side guide rollers to define the path thereof.

DETAILED DESCRIPTION OF THE PREFERRED EMBODIMENTS

Figure 3:
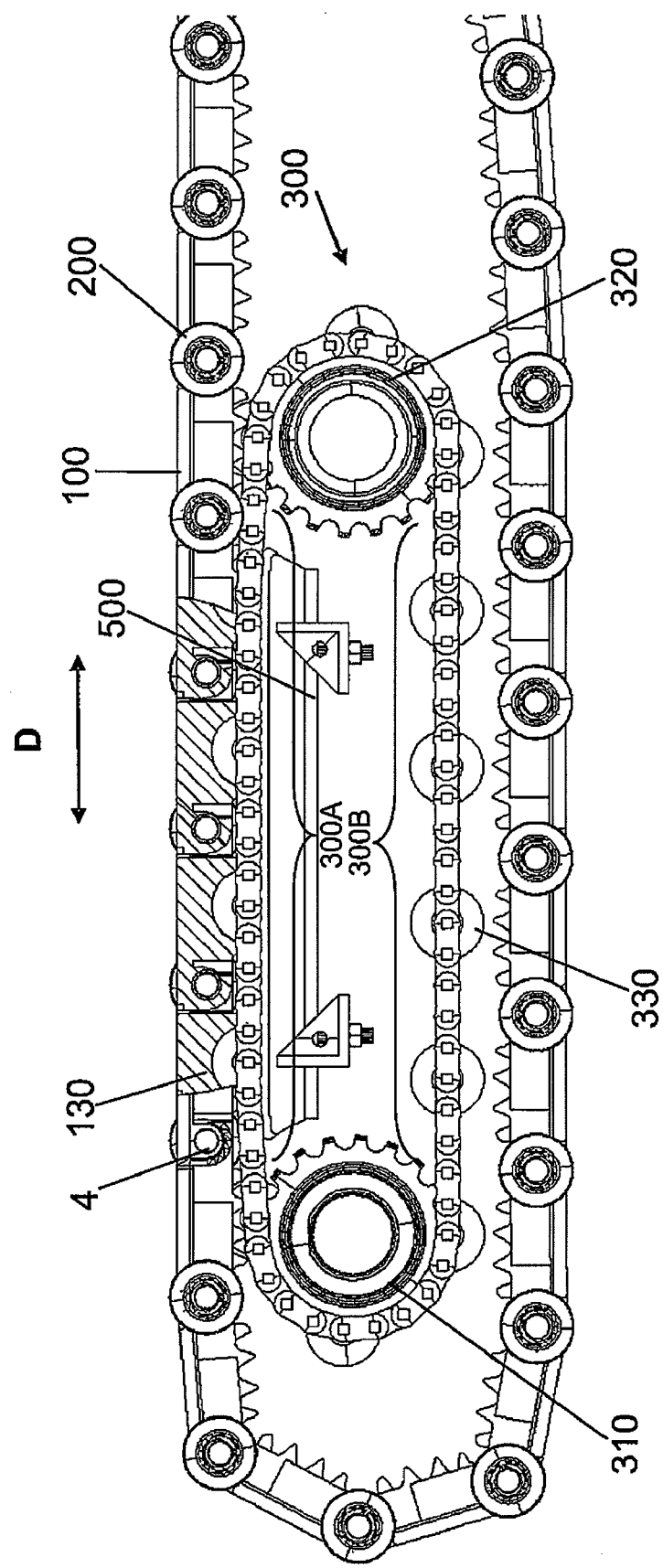
FIGS. 3 and 4 are enlarged side views of the pallet actuation system meshed with one or with two sides of the traction chain.
Figure 4:
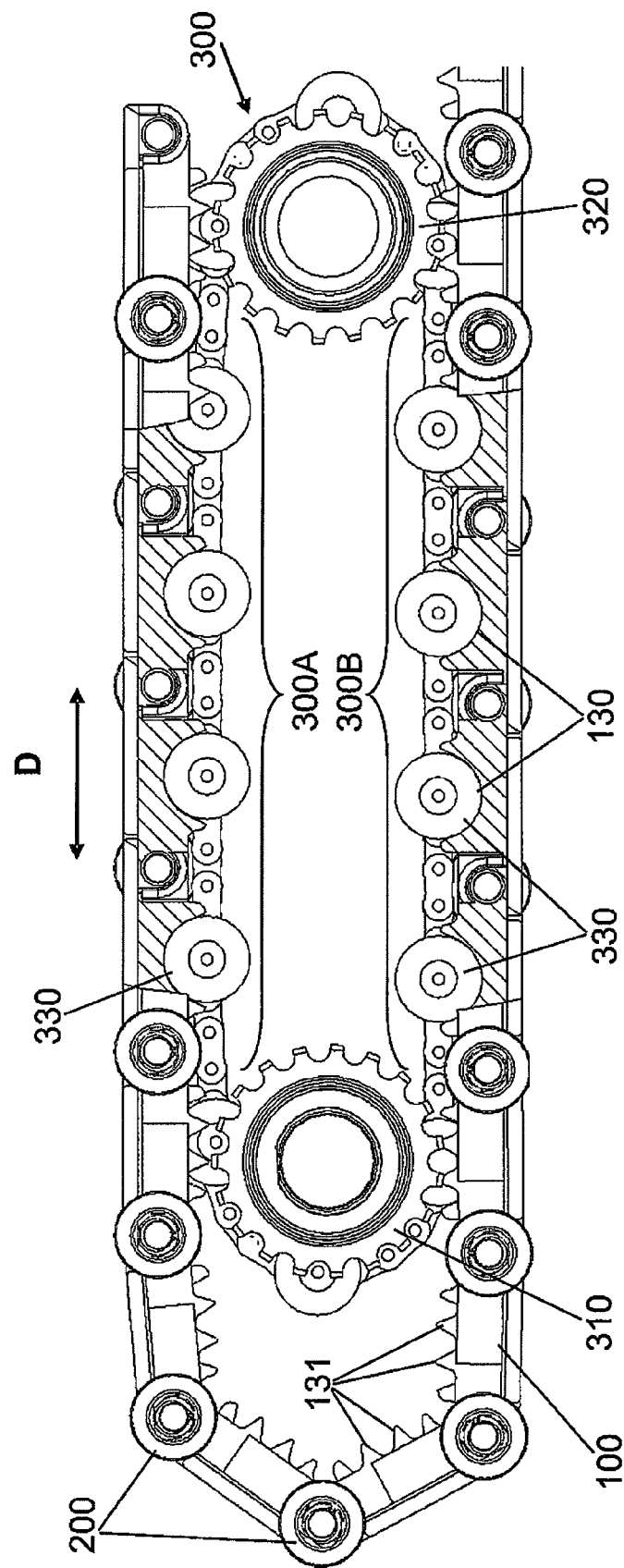

The invention will be described as being applied to a moving walkway. However, it must be understood that the concepts described in this specification can also be applied to other types of conveyor systems. It must also be indicated that the system of the invention can operate in both directions of transport of a load/people.

FIG. 1 shows a moving walkway having a supporting structure comprising an upper end section or head (1), a lower end section or head (2) and an intermediate section (3). A worm belt is made up of a series of links (100) which are connected by shafts-pins (4). These links (100) are held by bearing rollers (200) which are led by means of guides (230) designed in the bearing profile of the moving walkway. The guides (230) comprise an upper return section (211) and a lower return section (210) leading the links (100) at both ends of the system. The radiuses of the upper return section (211) and of the lower return section (210) can be small, greatly reducing the height of the heads in comparison with walkways according to the current state of the art.

In a preferred construction, the traction chain (100) is driven by the drive means formed by at least two drive chains (300) provided with deformable drive rollers (330) configured to mesh with the first arc-shaped contact means (130) of the lower portion of the links of the chain (100). In addition to the deformable drive rollers (330) fitted in the first arc-shaped contact means (130), the traction chains are also driven through the second teeth-shaped contact means (131) of the lower portion of the links (100). These teeth (131) are configured to mesh with the cavities defined between the links and bushings of the drive chains (300). The system further comprises a fixed part (500) configured to make contact in one side of the drive chain (300) opposite to that of the engagement with the traction links (100) in order to push the drive chain (300) against the traction links (100) in the engagement area to prevent a disengagement between the drive chain (300) and the traction links (100).

The drive chain (300) is actuated by small drive gear wheels (310, 320), a leading wheel, the leading drive wheel (310) and a follower wheel, the follower drive wheel (320), which are held by drive shafts (311, 321), a motor shaft, the motor drive shaft (311) and a follower shaft, the follower drive shaft (321). The motor drive shaft (311) is actuated by actuation means formed by an actuation chain (400) actuated by a geared motor (410) horizontally located in the upper end section (1) of the moving walkway.

Figure 5:
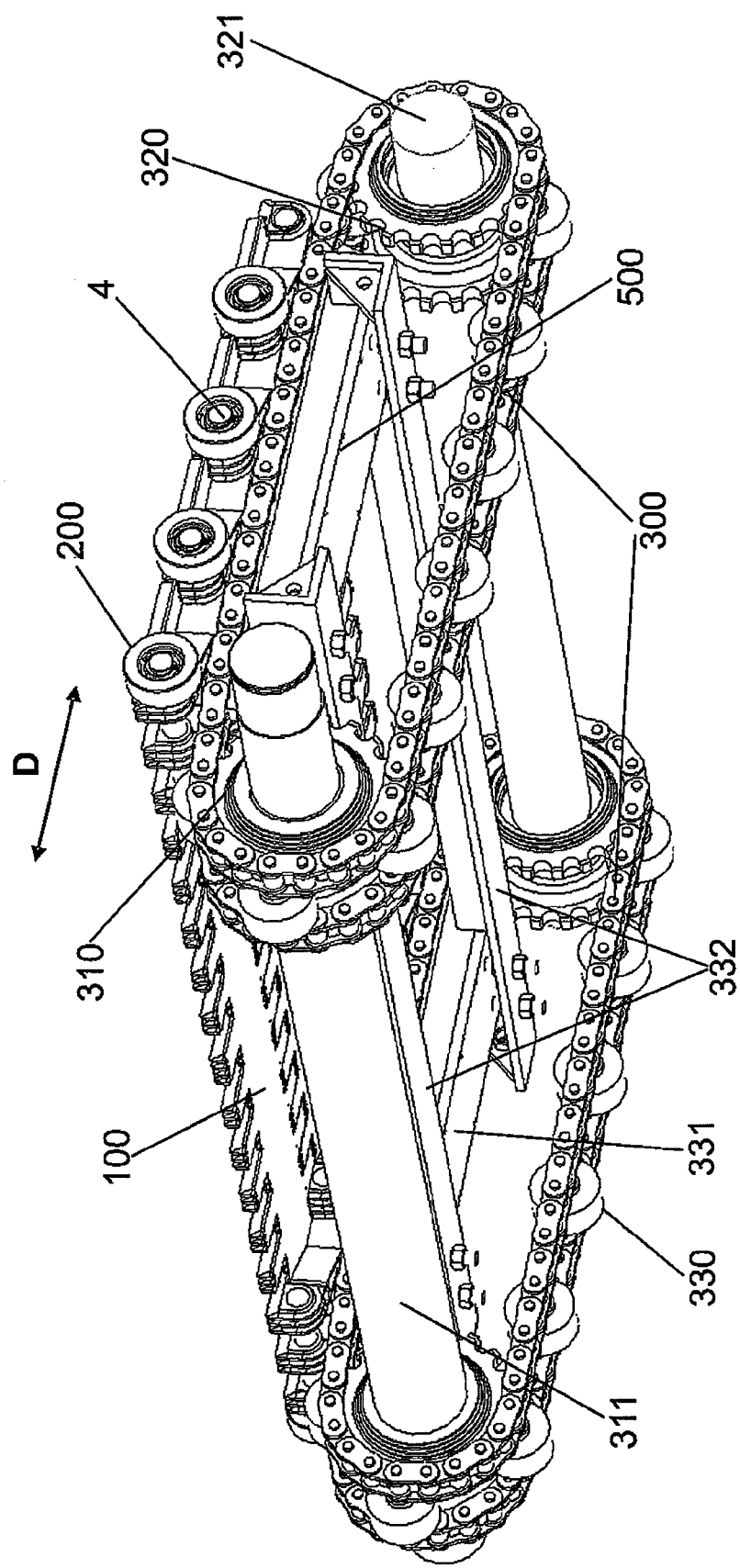
FIG. 5 is a perspective view of the pallet actuation system meshing with the traction chain.

FIG. 5 shows the basic configuration of the pallet actuation system (100) showing small actuation gear wheels (310, 320) and shafts (311, 321) actuating the drive chain (300) and its deformable drive rollers (330).

Figure 6:
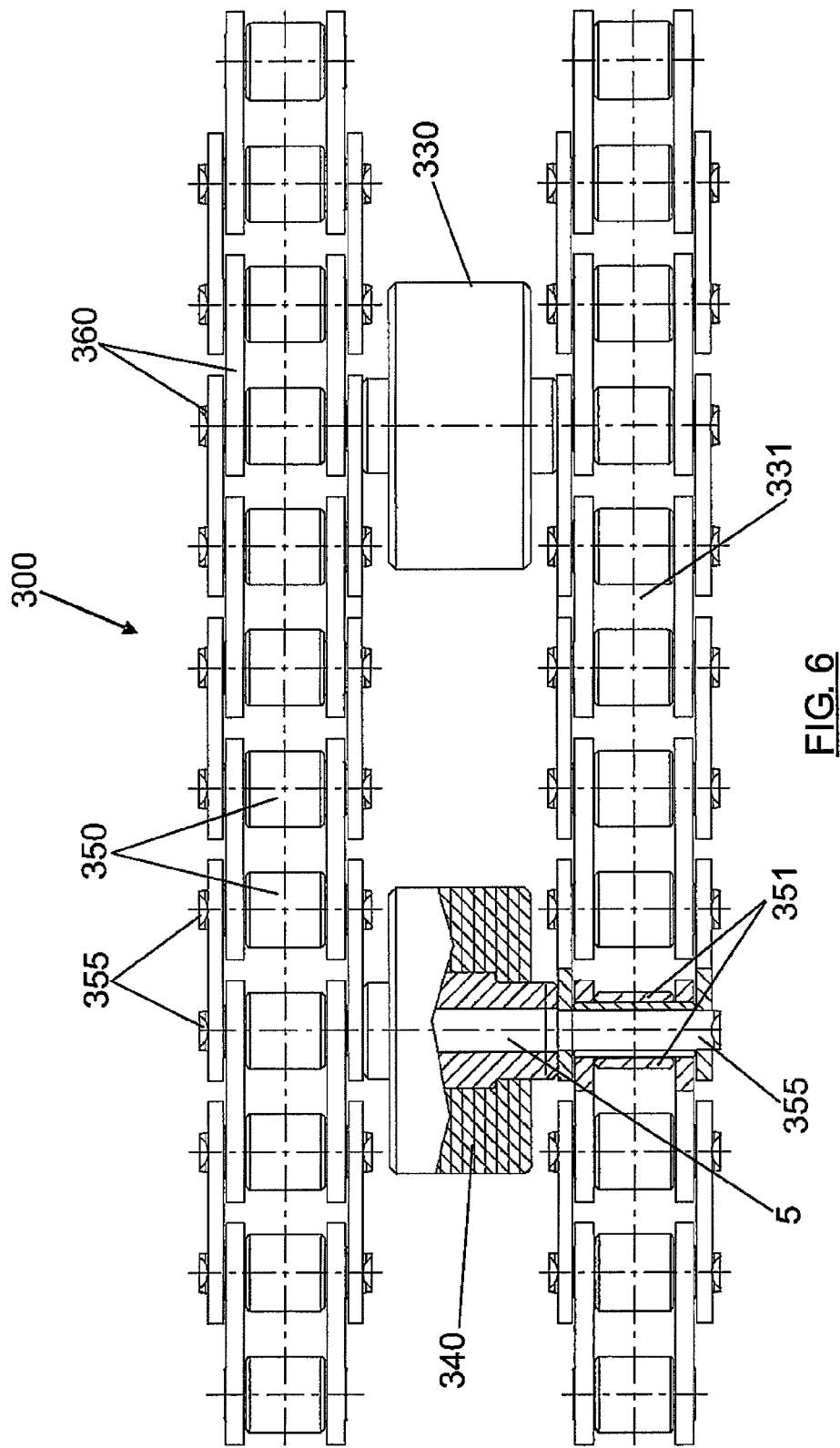
FIG. 6 is an enlarged upper plan view of the drive chain with deformable drive rollers.

FIG. 6 shows the enlarged view of the drive chain (300) with separate deformable drive rollers (330). The drive rollers (330) can be made of or can have a second laminated outer layer (340) made of deformable or elastic materials, such as polyurethane, elastomer or any form of polymer. The bushings (350) and the third outer layer (351) coating said bushings can also be seen in said figure.

Figure 7:
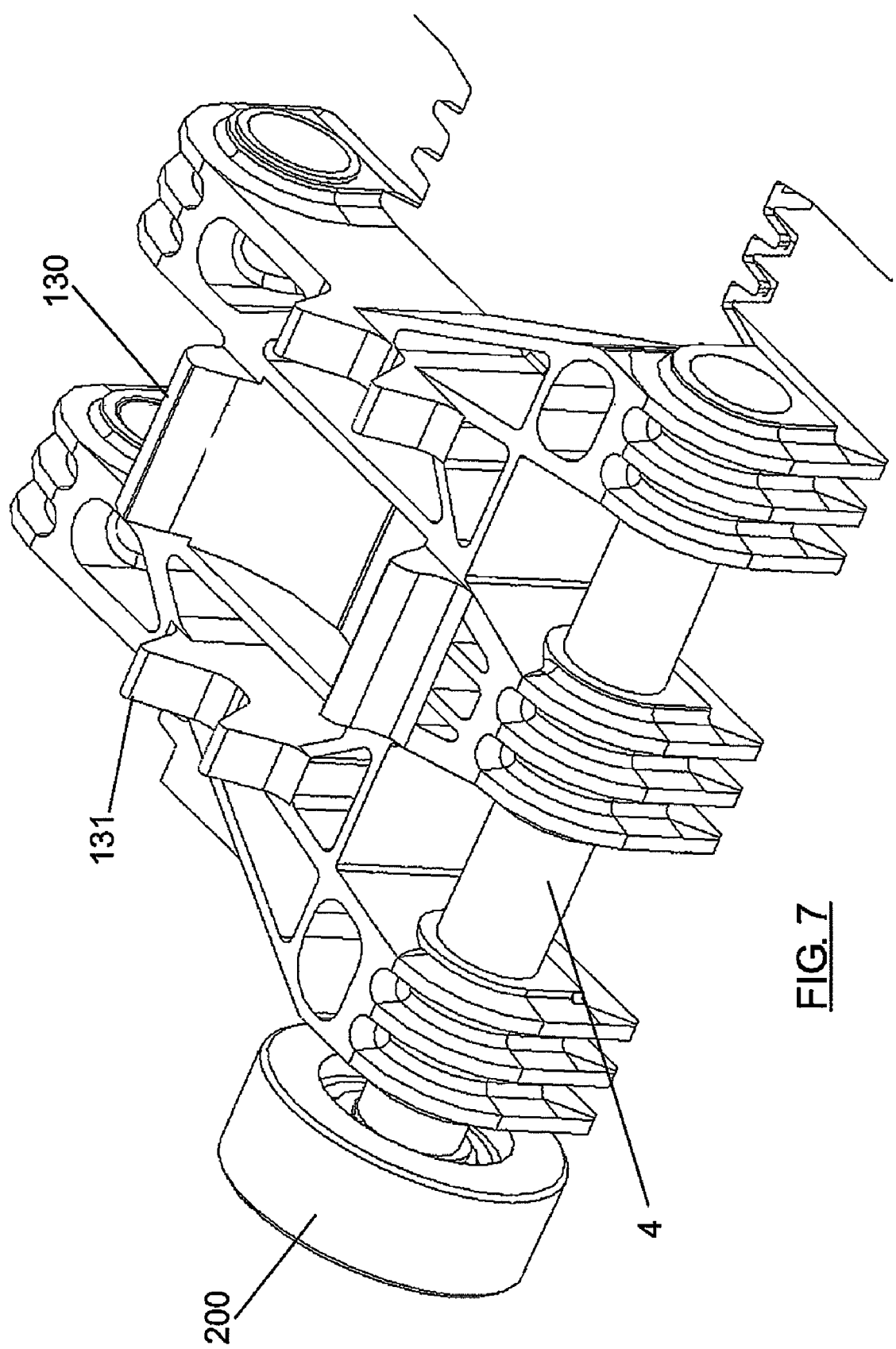
FIG. 7 is a perspective view of a traction link showing the contact teeth and the contact arc.

FIG. 7 shows a detail of the first arc-shaped contact means or claw (130) and of the second teeth-shaped contact means (131) under a traction link (100). To actuate the traction chain (100), a number of deformable drive rollers (330) will mesh with the same number of claws (130) under the links (100). In the event that an excessively high contact force is experienced by the deformable drive rollers (330), which could be due to the lengthening of the traction chain (100) or of the drive chain (300) caused by wear, more deformation than expected will occur in the deformable drive rollers (330). A situation of this type will make the teeth (131) under the traction link mesh with the cavities defined between the links and bushings of the drive chain (300). As a result, the high force will be shared between the deformable drive rollers (330) and teeth (131). This design assures that the chain of traction links (100) is actuated safely in all circumstances and will prolong the life of the deformable drive rollers (330) and the drive chain (300).

Figure 8:
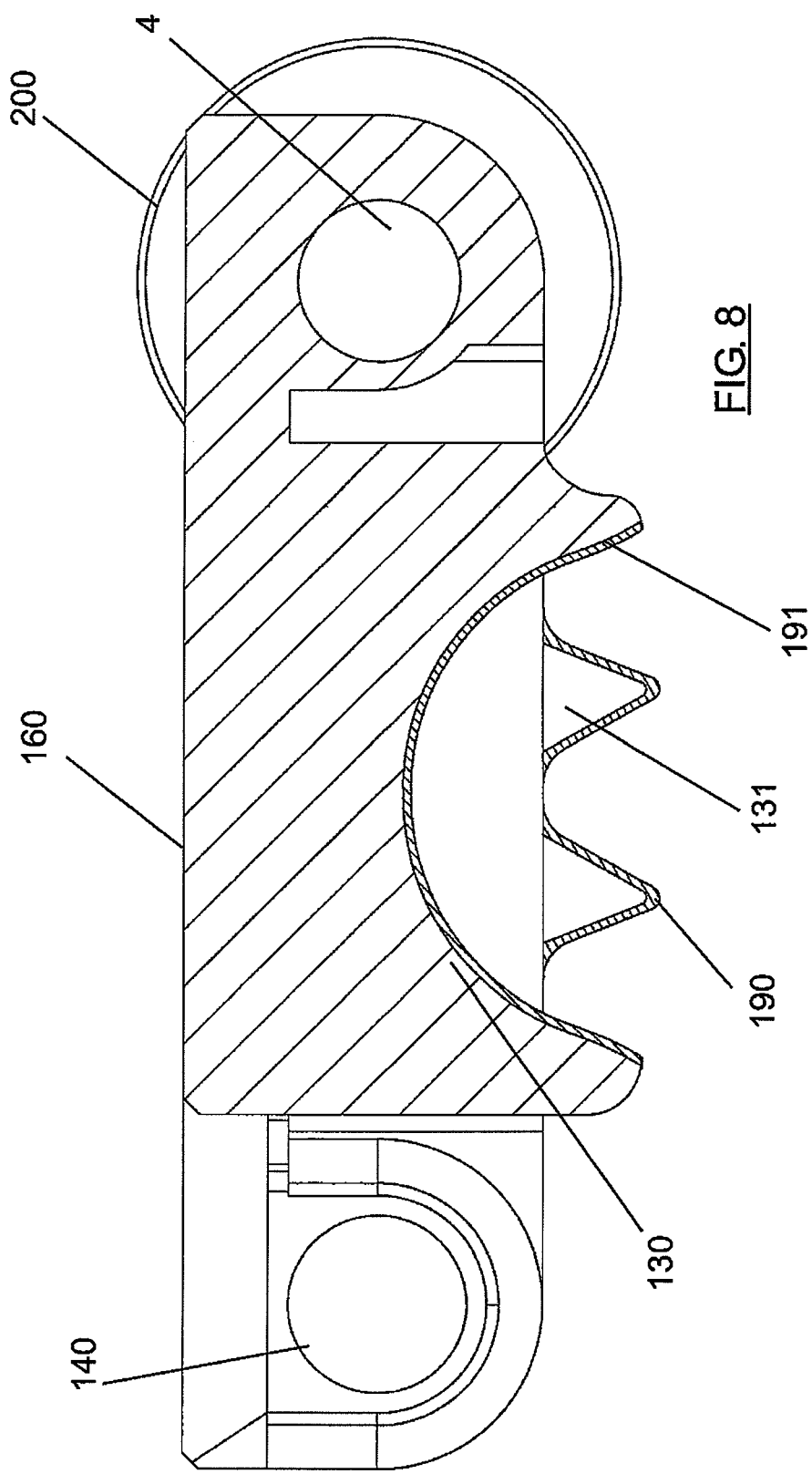
FIG. 8 is a side view of a traction link showing the contact teeth and the contact arc with a laminated outer layer.

FIG. 8 shows a section of the traction link with the claws (130) and with the teeth (131) of the traction link coated by a layer of deformable or elastic materials such as elastomers, polyurethane, or any form of polymer materials (190, 191).

The first (190, 191), second (340) and third (351) outer layers allow engagement between the different elements involved in the transmission of the movement to be much smoother than with a metal-metal contact, which means a much quieter operation and dampened contacts between starting and end engagement moments in addition to elongating the useful life of said elements, i.e., of the first engagement means formed by the concave arc (130) and the teeth (131), of the second engagement means formed by the drive roller (330) and the housings (331) defined between the bushings (350) and the links (360) of the drive chain (300).

FIG. 1 shows a detail of an inclined conveyor with transition areas (240, 241, 242, 243). Due to the position of the shafts-pins or rods (4) connecting the traction links (100), the transition radius can be reduced such that the overall dimensions of the conveyor are smaller than in the constructions of the state of the art.

FIG. 9 shows a detail of the drive chain (300) with the guide rollers (370) circulating through a guide and counter-guide path (400), allowing the upper branch of the drive chain (300A) to work by being pushed to move the traction links (100). As a result of this arrangement, it is not necessary to use high tension in the tension shaft of the drive chain (321) to assure that the chain always works by being pulled, increasing the life of the chain and safety in the event of overloading on the walkway.

The guide rollers (370) are assembled on the side of the drive chains by means of an elongated shaft (355) as indicated in FIG. 10.

In other words, the system further comprises:
a guide (400) and a counter-guide (400) on both sides of the drive chain (300) to define a path of the drive chain (300);
a plurality of guide rollers (370):
coaxially assembled with each of the shafts of the bushings (355) of the drive chain (300);
configured to circulate through the guide (400) and the counter-guide (400) preventing deviations of the chain due to a loss of tension of the drive chain (300) and preventing excessive tension in the tension shaft (321).

The invention claimed is:
1. A conveyor system for the transport of passengers/goods comprising:
a plurality of traction links connected together by shafts-pins perpendicular to a longitudinal direction of transport to form a chain of traction links, wherein the traction links comprise a functional surface having first engagement means laminated with a first outer layer comprising materials selected from deformable and resilient materials;

actuation means for transmitting actuation movement from at least one motor;

drive means configured for transmitting drive movement from the actuation means to the chain of traction links, wherein the drive means comprise second engagement means having a shape conjugated with the first engagement means, so that the traction links are driven by the drive means by engagement between the first engagement means and the second engagement means and driving said chain of traction links in the direction of transport.

2. The system of claim 1, wherein the conveyor system comprises a plurality of load conveyor pallets having:
a supporting surface configured to bear a passenger/good;
the functional surface opposite to the supporting surface having the traction links.

3. The system of claim 1, wherein the drive means comprise:
a first section between a follower drive wheel and a leading drive wheel according to the direction of transport;
a second section between a leading drive wheel and a follower drive wheel according to the direction of transport;
wherein the engagement between the first engagement means and the second engagement means occurs in an engagement area selected from the first section and the first section plus the second section.

4. The system of claim 1, wherein:
the first engagement means comprise a concave arc perpendicular to the longitudinal direction of transport; and
the second engagement means comprise a drive roller perpendicular to the longitudinal direction of transport;
wherein the first engagement means and the second engagement means form a first engagement, in a direction perpendicular to the longitudinal direction of transport, between the drive means and the chain of traction links when the drive roller is housed in the concave arc.

5. The system of claim 4, wherein:
the first engagement means comprise a plurality of teeth-shaped projections perpendicular to the longitudinal direction of transport; and
the second engagement means comprise a plurality of housings perpendicular to the longitudinal direction of transport;
wherein the first engagement means and the second engagement means form a second engagement, in a direction perpendicular to the longitudinal direction o1 transport, between the drive means and the chain of traction links when the teeth-shaped projections are housed in the housings, and wherein in the first engagement the drive roller deforms to prevent excessive load on the drive roller.

6. The system of claim 1, wherein the drive means comprise:
at least one pair of drive chains formed by links and bushings, the drive chains of each pair being opposing such that the shafts of the bushings are co-linear;
a plurality of drive rollers between the drive chains, the shaft of said drive rollers being co-linear with the shaft of two opposing bushings.

7. The system of claim 6, wherein the drive rollers have a length substantially equal to a space between the drive chains of each pair.

8. The system of claim 6, wherein the conveyor system comprises a drive roller for each traction link.

9. The system of claim 5, wherein the drive means comprise at least one drive chain formed by links and bushings, a plurality of cavities configured so that the teeth mesh with the chain in said cavity being defined between the links and bushings.

10. The system of claim 4, wherein the drive rollers are made of materials selected from deformable and resilient materials.

11. The system of claim 4, wherein the drive rollers arc laminated with a second outer layer comprising materials selected from deformable and resilient materials.

12. The system of claim 10, wherein the drive rollers are made of polymer materials.

13. The system of claim 11, wherein the drive rollers are laminated with a second outer layer made of polymer materials.

14. The system of claim 12, wherein the polymer materials are selected from one of: elastomers; polyurethanes; and a combination of elastomers and polyurethanes.

15. The system of claim 6, wherein the bushings of the drive chain are coated with a third outer layer comprising materials selected from deformable and resilient materials.

16. The system of claim 15, wherein the third outer layer is made of polymer materials.

17. The system of claim 16, wherein the polymer materials are selected from one of: elastomers; polyurethanes; and a combination of elastomers and polyurethanes.

18. The system of claim 1, wherein the connection between links through the shafts-pins is lubricated by lubricants selected from dry and wet lubricants.

19. The system of claim 6, wherein the Connection between the shafts of the drive roller and the drive rollers is carried out by ball bearings.

20. The system of claim 3, wherein the conveyor system further comprises a fixed part configured to make contact with the drive chain on one side or the drive chain opposite to that of the engagement with the traction links to push the drive chain against the traction links in the engagement area to prevent a disengagement between the drive chain and the traction links.

21. The system or claim 6, wherein the conveyor system further comprises:
a guide and a counter-guide on both sides of the drive chain to define a path of the drive chain;
a plurality of guide rollers;
coaxially assembled with each of the shafts of the bushings of the drive chain;
configured to circulate through the guide and the counter-guide preventing deviations of the chain due to the loss of tension of the drive chain and preventing excessive tension in the tension shall.

22. The system of claim 21, wherein the conveyor system further comprises a hearing in the connection between the shaft or the chain and the guide roller.

* * * * *